US012730892B2

(12) United States Patent
Shimizu et al.

(10) Patent No.: US 12,730,892 B2
(45) Date of Patent: Sep. 8, 2026

(54) ANALYSIS EVASION FUNCTION DETECTION SYSTEM AND ANALYSIS EVASION FUNCTION DETECTION METHOD

(71) Applicant: Hitachi, Ltd., Tokyo (JP)

(72) Inventors: Ryoji Shimizu, Tokyo (JP); Shota Fujii, Tokyo (JP); Takayuki Satou, Tokyo (JP)

(73) Assignee: HITACHI, LTD., Tokyo (JP)

( * ) Notice: Subject to any disclaimer, the term of this patent is extended or adjusted under 35 U.S.C. 154(b) by 64 days.

(21) Appl. No.: 18/827,933

(22) Filed: Sep. 9, 2024

(65) Prior Publication Data

US 2025/0298898 A1 Sep. 25, 2025

(30) Foreign Application Priority Data

Mar. 19, 2024 (JP) ................................ 2024-044191

(51) Int. Cl.
*G06F 21/00* (2013.01)
*G06F 21/56* (2013.01)
*G06F 21/64* (2013.01)

(52) U.S. Cl.
CPC ........... *G06F 21/566* (2013.01); *G06F 21/64* (2013.01)

(58) Field of Classification Search
None
See application file for complete search history.

(56) References Cited

U.S. PATENT DOCUMENTS 8,418,249 B1 * 4/2013 Nucci .................. G06F 21/552 709/225
8,918,881 B2 * 12/2014 Bettini ................ H04L 63/0823 713/188
11,134,089 B2 * 9/2021 Onodera .............. G06F 21/566
2013/0160121 A1 * 6/2013 Yazdani .................. G06F 21/54 726/23
2013/0326625 A1 * 12/2013 Anderson ............ G06F 21/566 726/23
2018/0268130 A1 * 9/2018 Ghosh ..................... G06F 21/53
2019/0081963 A1 * 3/2019 Waghorn ................ G06F 9/542
2019/0386969 A1 * 12/2019 Verzun .................. G06F 21/606
2021/0089647 A1 * 3/2021 Suwad .................. G06F 21/552
2022/0377093 A1 * 11/2022 Crabtree ............... H04L 43/045
2024/0346142 A1 * 10/2024 Kim ...................... G06F 21/565
2024/0348639 A1 * 10/2024 Kim .................... H04L 63/1425

FOREIGN PATENT DOCUMENTS

JP 2019-79500 A 5/2019

OTHER PUBLICATIONS

Shen, Feng et al. Android Malware Detection Using Complex-Flows. IEEE Transactions on Mobile Computing, vol. 18, Issue: 6. https://ieeexplore.ieee.org/stamp/stamp.jsp?tp=&arnumber=8423084 (Year: 2019).*

(Continued)

*Primary Examiner* — Jeremiah L Avery
(74) *Attorney, Agent, or Firm* — MATTINGLY & MALUR, PC

(57) ABSTRACT

A branch related to an evasion function of malware in a control flow graph is specified using a signature to detect the evasion function.

13 Claims, 8 Drawing Sheets

(56) References Cited

OTHER PUBLICATIONS

Nguyen, Huyen N. et al. MalView: Interactive Visual Analytics for Comprehending Malware Behavior. IEEE Access, vol. 10. https://ieeexplore.ieee.org/stamp/stamp.jsp?tp=&arnumber=9895250 (Year: 2022).*

Alam, Shahid et al. MARD: A Framework for Metamorphic Malware Analysis and Real-Time Detection. 2014 IEEE 28th International Conference on Advanced Information Networking and Applications. https://ieeexplore.ieee.org/stamp/stamp.jsp?tp=&arnumber=6838703 (Year: 2014).*

D. Kirat and G. Vigna: MalGene: Automatic Extraction of Malware Analysis Evasion Signature, Proceedings of the 2015 ACM SIGSAC Conference on Computer and Communications Security (CCS 2015).

M. Lindorfer, C. Kolbitsch and P. Milani Comparetti: Detecting Environment-Sensitive Malware, In: Sommer, R., Balzarotti, D., Maier, G. (eds) Recent Advances in Intrusion Detection. RAID 2011. Lecture Notes in Computer Science, vol. 6961. Springer, Berlin, Heidelberg.

* cited by examiner

F I G. 1
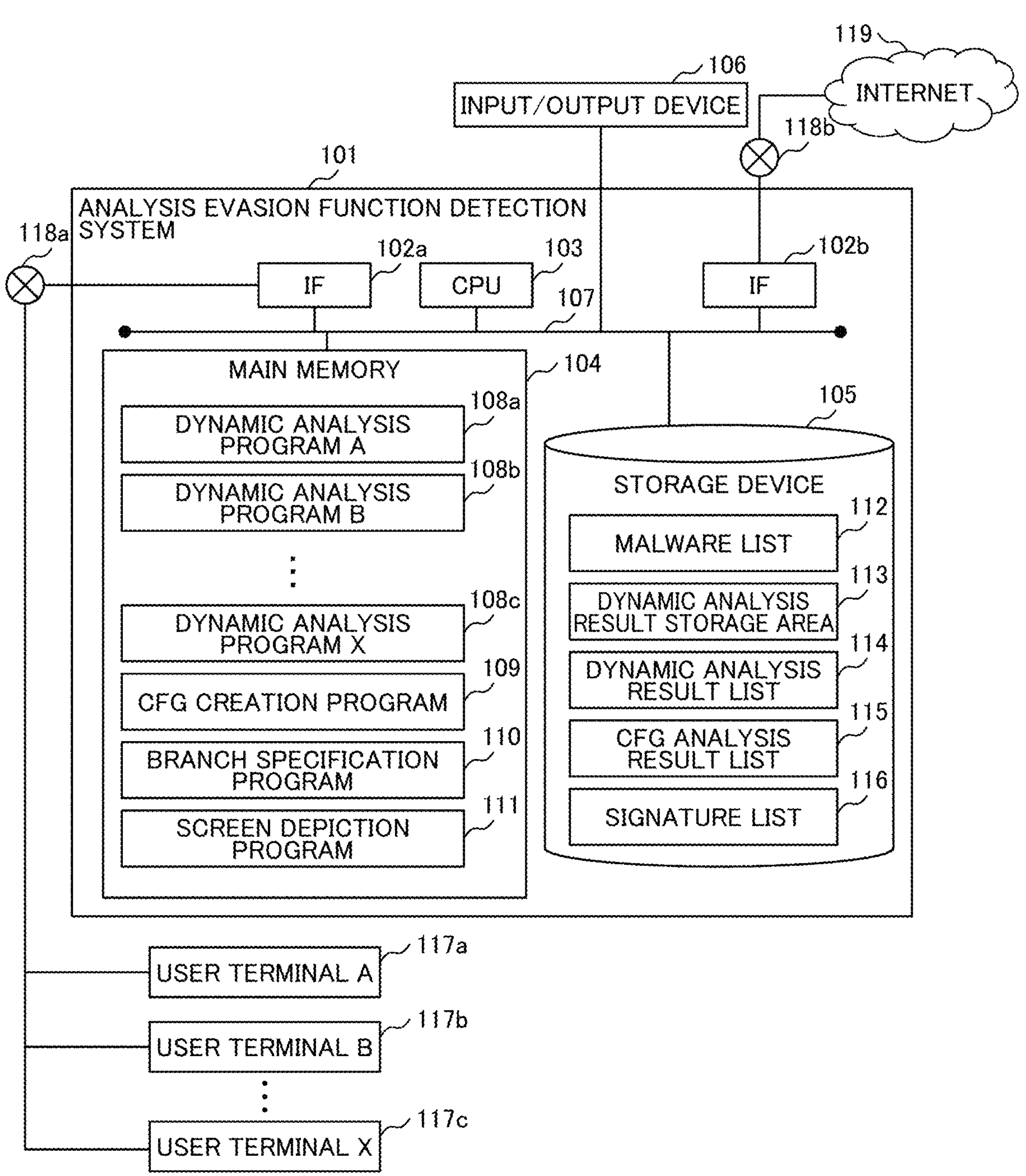

| MALWARE ID | REGISTRATION DATE AND TIME | FILE NAME | HASH VALUE |
|---|---|---|---|
| 0 | 2023-01-01 10:00:00 | example.exe | 44D88612FEA8A8F36DE82E1278ABB02F |
| 1 | ... | ... | ... |
| ... | ... | ... | ... |

| MALWARE ID | ANALYSIS DATE AND TIME | DYNAMIC ANALYSIS RESULT PATH A | DYNAMIC ANALYSIS RESULT PATH B | ... | DYNAMIC ANALYSIS RESULT PATH X | CFG PATH |
|---|---|---|---|---|---|---|
| 0 | 2023-01-01 10:00:00 | /dynamic_analysis/0/a/result.json | /dynamic_analysis/0/b/result.json | ... | /dynamic_analysis/0/x/result.json | /cfg/0/result.json |
| 1 | ... | ... | ... | ... | ... | ... |
| ... | ... | ... | ... | ... | ... | ... |

| MALWARE ID | ANALYSIS DATE AND TIME | FUNCTION RELATED TO EVASION FUNCTION | EVADED ENVIRONMENT |
|---|---|---|---|
| 0 | 2023-01-01 12:00:00 | NtOpenKey, HKLM/System/ControlSet001/Services/Disk/Enum | ・DYNAMIC ANALYSIS PROGRAM B |
| 1 | ... | ... | ... |
| ... | ... | ... | ... |

F I G. 9
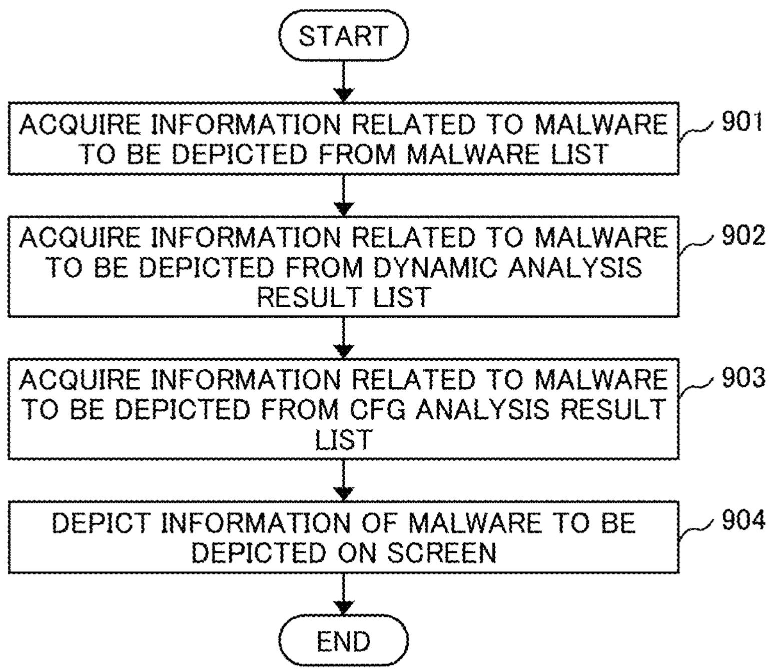

FIG. 10

MALWARE SUMMARY 1001

| MALWARE ID | REGISTRATION DATE AND TIME | FILE NAME | HASH VALUE |
|---|---|---|---|
| 0 | 2023-01-01 10:00:00 | example.exe | 44D88612FEA8A8F36DE82E1278ABB02F |

| MALWARE ID | ANALYSIS DATE AND TIME | DYNAMIC ANALYSIS RESULT PATH A | DYNAMIC ANALYSIS RESULT PATH B | ... | DYNAMIC ANALYSIS RESULT PATH X | CFG PATH |
|---|---|---|---|---|---|---|
| 0 | 2023-01-01 10:00:00 | /dynamic_analysis/0/a/result.json | /dynamic_analysis/0/b/result.json | ... | /dynamic_analysis/0/x/result.json | /cfg/0/result.json |
| 1 | ... | ... | ... | ... | ... | ... |
| ... | ... | ... | ... | ... | ... | ... |

ANALYSIS EVASION FUNCTION DETECTION RESULT 1002

| MALWARE ID | ANALYSIS DATE AND TIME | FUNCTION RELATED TO EVASION FUNCTION | EVADED ENVIRONMENT |
|---|---|---|---|
| 0 | 2023-01-01 12:00:00 | NtOpenKey, HKLM/System/ControlSet001/Services/Disk/Enum | •DYNAMIC ANALYSIS PROGRAM B |

| SIGNATURE ID | REGISTRATION DATE AND TIME | SIGNATURE NAME |
|---|---|---|
| 0 | 2023-01-01 10:00:00 | signature_0.exe |
| 1 | ... | ... |
| ... | ... | ... |

ANALYSIS EVASION FUNCTION DETECTION SYSTEM AND ANALYSIS EVASION FUNCTION DETECTION METHOD

CROSS-REFERENCE TO RELATED APPLICATION

The present application claims priority from Japanese application JP2024-044191, filed on Mar. 19, 2024, the content of which is hereby incorporated by reference into this application.

BACKGROUND OF THE INVENTION

1. Field of the Invention

The present invention relates to an analysis evasion function detection system and an analysis evasion function detection method.

2. Description of the Related Art

There is dynamic analysis that actually runs malware, records a behavior of the malware, and performs analysis. This analysis method is widely used because it can be executed semi-automatically and can perform analysis efficiently. On the other hand, there is malware having a function of evading dynamic analysis, such as a function of stopping an operation unless a specific language setting is used, and a task is to cope with this malware. Techniques related to this include JP 2019-79500 A, D. Kirat and G. Vigna: MalGene: Automatic Extraction of Malware Analysis Evasion Signature, Proceedings of the 2015 ACM SIGSAC Conference on Computer and Communications Security (CCS 2015), and M. Lindorfer, C. Kolbitsch and P. Milani Comparetti: Detecting Environment-Sensitive Malware, In: Sommer, R., Balzarotti, D., Maier, G. (eds) Recent Advances in Intrusion Detection. RAID 2011. Lecture Notes in Computer Science, vol 6961. Springer, Berlin, Heidelberg.

The detection and analysis of an evasion function of malware are basically performed manually, and there is a problem in that operational costs and dependency on individual skills are high. In addition, there are several known automation methods. However, the automation methods are currently incomplete and particularly do not have a sufficient response to unknown evasion functions.

JP 2019-79500 A discloses a method that creates a control flow graph (CFG) from dynamic analysis logs of a plurality of environments and detects malware using behavior rules. This technique focuses on detecting malware and does not detect or analyze functions.

D. Kirat and G. Vigna: MalGene: Automatic Extraction of Malware Analysis Evasion Signature, Proceedings of the 2015 ACM SIGSAC Conference on Computer and Communications Security (CCS 2015) discloses a method that compares dynamic analysis logs of two environments, specifies a part related to an evasion function in the log from a difference in behavior, and extracts a function related to the evasion functions as a signature. The object of the method is to automatically extract the signature using a database of malware having the evasion function, and the method does not respond to unknown evasion functions. In addition, since the presence of a single function is used as the signature, it is not possible to respond to a complex evasion function.

M. Lindorfer, C. Kolbitsch and P. Milani Comparetti: Detecting Environment-Sensitive Malware, In: Sommer, R., Balzarotti, D., Maier, G. (eds) Recent Advances in Intrusion Detection. RAID 2011. Lecture Notes in Computer Science, vol 6961. Springer, Berlin, Heidelberg discloses a method that compares dynamic analysis logs of a plurality of environments to determine whether or not an evasion function is present. The object of the method is only to determine whether or not the evasion function is present and does not detect or analyze the function. In addition, all logs are compared to determine the presence of the evasion function from the magnitude of the difference. Therefore, it is not possible to specify the evasion function in the log.

SUMMARY OF THE INVENTION

An object of the present invention is to provide an analysis evasion function detection system that supports detection and analysis of an analysis evasion function to reduce operational costs and dependency on individual skills.

According to an aspect of the present invention, there is provided an analysis evasion function detection system for malware connected to the Internet. The analysis evasion function detection system includes: a plurality of dynamic analysis units performing dynamic analysis of the malware; a control flow graph creation unit combining dynamic analysis results of a plurality of dynamic analysis operations performed by the plurality of dynamic analysis units to create a control flow graph related to the malware; a branch specification unit specifying a branch related to an evasion function of the malware in the control flow graph with a predetermined signature to detect the evasion function; and a screen depiction unit presenting the evasion function of the malware as support information to an analyst.

According to an aspect of the present invention, the analysis evasion function detection system can support the detection and analysis of the evasion function to reduce operational costs and dependency on individual skills.

BRIEF DESCRIPTION OF THE DRAWINGS

FIG. 1 is a diagram illustrating an example of a configuration of an analysis evasion function detection system according to Embodiment 1;

FIG. 2 is a diagram illustrating an example of a malware list;

FIG. 3 is a diagram illustrating an example of a dynamic analysis result list;

FIG. 4 is a diagram illustrating an example of a control flow graph analysis result list;

FIG. 9 is a diagram illustrating a flow of a screen depiction process;

FIG. 10 is a diagram illustrating an example of a depiction screen of the analysis evasion function detection system;

DETAILED DESCRIPTION OF THE PREFERRED EMBODIMENTS

Figure 5:
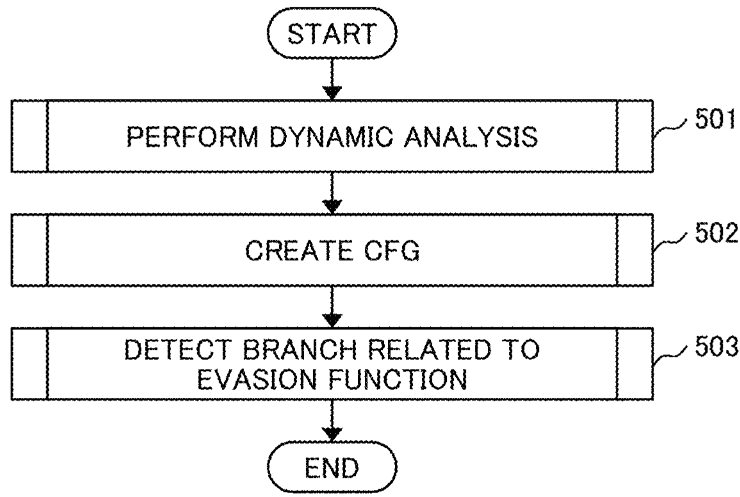
FIG. 5 is a diagram illustrating an overall processing flow according to Embodiment 1.

Hereinafter, embodiments of the present invention will be described with reference to the drawings. However, the present invention is not interpreted as being limited to the content of the embodiments described below. It will be easily understood by those skilled in the art that a specific configuration of the present invention can be modified without departing from the concept or gist of the present invention.

In the configurations of the invention that will be described below, the same or similar configurations or functions are denoted by the same reference numerals, and a duplicated description thereof will be omitted.

In this specification, the terms "first", "second", "third", and the like are used to identify components and do not necessarily limit the number or order of components.

In some cases, the position, size, shape, range, and the like of each component illustrated in the drawings and the like do not indicate the actual position, size, shape, range, and the like in order to facilitate understanding of the invention. Therefore, the present invention is not limited to the position, size, shape, range, and the like disclosed in the drawings and the like.

Embodiment 1

Embodiment 1 shows a process of an analysis evasion function detection system in a case where dynamic analysis logs of a plurality of environments are combined to create a control flow graph, a branch related to an evasion function is detected using a signature related to a pattern of the graph, the corresponding part of the log and related information are output to support the analysis or detection of an analysis evasion function, thereby reducing operational costs or dependency on individual skills.

FIG. 1 is a diagram illustrating an example of a configuration of an analysis evasion function detection system according to Embodiment 1 of the present invention.

In an analysis evasion function detection system 101 according to Embodiment 1, a user terminal 117 operated by a user and the Internet 119 are connected via a network 118.

The analysis evasion function detection system 101 is a computer including a central processing unit (CPU) 103, a main memory 104 for storing data necessary for the CPU 103 to execute processes, a storage device 105, such as a hard disk or a flash memory, having the capacity to store a large amount of data, an interface (IF) 102 for communicating with other devices, an input/output device 106, such as a keyboard or a display, for inputting and outputting data, and a communication path 107 connecting these devices. In addition, the communication path 107 is, for example, an information transmission medium such as a bus or a cable.

The CPU 103 executes a dynamic analysis program 108 stored in the main memory 104 to perform dynamic analysis of malware to be analyzed, executes a control flow graph (CFG) creation program 109 to combine analysis results to create a CFG, executes a branch specification program 110 to detect the branch related to the evasion function in the CFG, and executes a screen depiction program 111 to present each analysis result through a screen.

The storage device 105 stores a malware list 112 for managing information of malware, a dynamic analysis result storage area 113 that stores the results of the dynamic analysis of the malware or the created CFG, a dynamic analysis result list 114 for managing each analysis result of the malware or the CFG, a CFG analysis result list 115 for managing the analysis results of the CFG, and a signature list 116 for managing the signature of the evasion function.

Each of the above-described programs and data may be stored in advance in the main memory 104 or the storage device 105 or may be installed (loaded) from the input/output device 106 or from another device via the IF 102 when needed.

In addition, the configuration of the analysis evasion function detection system described with reference to FIG. 1 is only an example, and the present invention is not limited thereto.

FIG. 2 is a diagram illustrating an example of the malware list 112.

As illustrated in FIG. 2, the malware list 112 is configured to include, for example, a malware ID 201, a registration date and time 202, a file name 203, and a hash value 204.

The malware ID 201 is a field that stores identification information for uniquely identifying the malware to be analyzed. In Embodiment 1, a number is stored as the identification information in the malware ID 201.

The registration date and time 202 indicates the date and time when the malware was registered in the system. For example, malware corresponding to an entry with a malware ID 201 of "0" was registered at 10:00:00 on Jan. 1, 2023. The present invention is not limited to the data format of the time stored in the registration date and time 202. Any data format, such as Unixtime, may be used as long as the data format can determine the time.

The file name 203 is a field that stores the file name of the malware to be analyzed. For example, the file name of the malware corresponding to the entry with the malware ID 201 of "0" is "example.exe".

The hash value 204 is a field that stores a hash value of the malware to be analyzed. For example, the hash value of the malware corresponding to the entry with the malware ID 201 of "0" is "44D88612FEA8A8F36DE82E1278ABB02F".

In addition, the malware list described with reference to FIG. 2 is only an example, and the present invention is not limited thereto.

Figure 12:
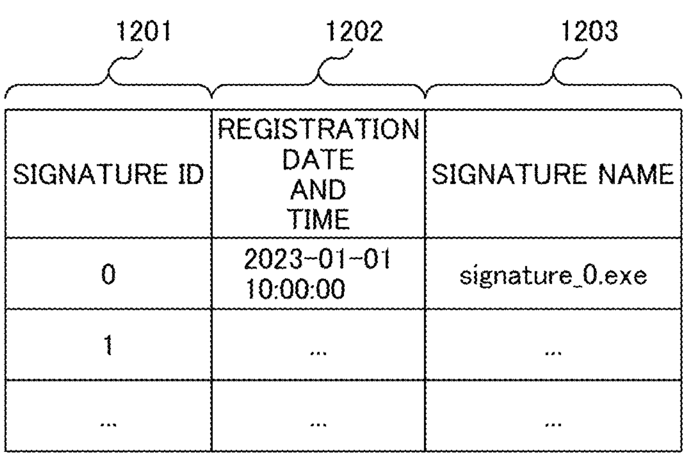
FIG. 12 is a diagram illustrating an example of a signature list.

FIG. 12 is a diagram illustrating an example of the signature list.

As illustrated in FIG. 12, the signature list 116 is configured to include, for example, a signature ID 1201, a registration date and time 1202, and a signature name 1203. Further, the signature list described with reference to FIG. 12 is an example, and the present invention is not limited thereto.

FIG. 3 is a diagram illustrating an example of the dynamic analysis result list 114.

As illustrated in FIG. 3, the dynamic analysis result list 114 is configured to include, for example, a malware ID 301, an analysis date and time 302, a dynamic analysis result path 303, and a CFG path 304.

The malware ID 301 is a field that stores identification information for uniquely identifying the malware to be analyzed. In Embodiment 1, a number is stored as the identification information in the malware ID 301.

The analysis date and time 302 indicates the date and time when the malware was analyzed by the system. For example, malware corresponding to an entry with a malware ID 301 of "0" was analyzed at 10:00:00 on Jan. 1, 2023. The present invention is not limited to the data format of the time stored in the analysis date and time 302. Any data format, such as Unixtime, may be used as long as the data format can determine the time.

The dynamic analysis result path 303 indicates the path of the dynamic analysis result storage area 113 in which the results of the dynamic analysis of the malware have been stored. For example, the results of the dynamic analysis of the malware with the malware ID 301 of "0" by a dynamic analysis program A 108*a* are stored in "/dynamic_analysis/0/a/result.json". The results of the dynamic analysis of the malware by a dynamic analysis program B 108*b* are stored in "/dynamic_analysis/0/b/result.json". The results of the dynamic analysis of the malware by a dynamic analysis X 108*x* are stored program in "/dynamic_analysis/0/x/result.json".

The CFG path 304 indicates the path of the dynamic analysis result storage area 113 in which the created CFG has been stored. For example, the CFG of the malware with the malware ID 301 of "0" is stored in "/cfg/0/result.json". In addition, the dynamic analysis result list described with reference to FIG. 3 is only an example, and the present invention is not limited thereto.

FIG. 4 is a diagram illustrating an example of the CFG analysis result list 115.

As illustrated in FIG. 4, the CFG analysis result list 115 is configured to include, for example, a malware ID 401, an analysis date and time 402, a function 403 related to the evasion function, and an evaded environment 404.

The malware ID 401 is a field that stores identification information for uniquely identifying the malware to be analyzed. In Embodiment 1, a number is stored as the identification information in the malware ID 401.

The analysis date and time 402 indicates the date and time when the malware was analyzed by the system. For example, malware corresponding to an entry with a malware ID 401 of "0" was analyzed at 12:00:00 on Jan. 1, 2023. The present invention is not limited to the data format of the time stored in the analysis date and time 402. Any data format, such as Unixtime, may be used as long as the data format can determine the time.

The function 403 related to the evasion function is a field that analyzes the CFG using the signature list 116 and stores the function related to the evasion function. For example, for the malware corresponding to the entry with the malware ID 401 of "0", a function "NtOpenKey, HKLM/System/ControlSet001/Services/Disk/Enum" is likely to be involved in the evasion function. This function is specified by the branch specification program 110 which will be described below. The CFG analysis result list described with reference to FIG. 4 is only an example, and the present invention is not limited thereto.

Next, the process performed by the analysis evasion function detection system 101 will be described.

FIG. 5 is a flowchart illustrating an outline of the process performed by the analysis evasion function detection system 101 according to Embodiment 1.

First, the analysis evasion function detection system 101 performs dynamic analysis (step 501). Details thereof will be described using FIG. 6.

Then, a CFG is created (step 502). Details thereof will be described using FIG. 7.

Finally, the branch related to the evasion function in the CFG is detected (step 503). Details thereof will be described using FIG. 8.

In addition, the processing flow of the analysis evasion function detection system described with reference to FIG. 5 is only an example, and the present invention is not limited thereto.

Figure 6:
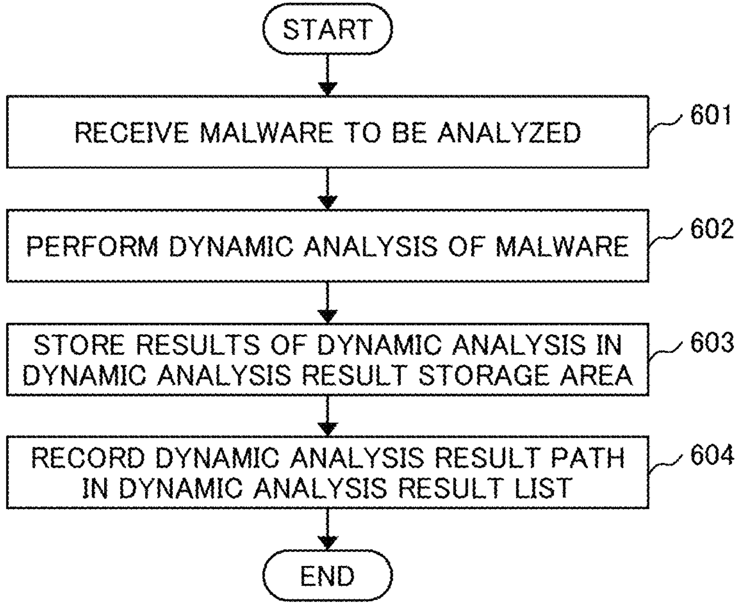
FIG. 6 is a diagram illustrating a flow of a dynamic analysis process.

FIG. 6 is a flowchart illustrating an example of the dynamic analysis process performed by the analysis evasion function detection system 101 according to Embodiment 1.

When receiving an execution instruction, the dynamic analysis program 108 executed by the CPU 103 starts the process described below.

The dynamic analysis program 108 receives the malware to be analyzed from the user (step 601).

Then, the dynamic analysis program 108 performs dynamic analysis of the malware received in step 601 (step 602). For example, the dynamic analysis program 108 actually runs the malware for a predetermined period of time to obtain information of the connection destination, operation process, and generated file of the malware.

Then, the dynamic analysis program 108 stores the results of the dynamic analysis of the malware obtained in step 602 in the dynamic analysis result storage area 113 (step 603).

Then, the dynamic analysis program 108 records the storage path of the results of the dynamic analysis of the malware stored in step 603 in the dynamic analysis result path 303 of the dynamic analysis result list 114 and ends the process (step 604).

In addition, the dynamic analysis processing method described with reference to FIG. 6 is an example, and the present invention is not limited thereto. Furthermore, the results of the dynamic analysis of the malware may be acquired from a source other than the dynamic analysis program 108 and then recorded. For example, the results may be acquired from an external malware analysis system or malware analysis service.

Figure 7:
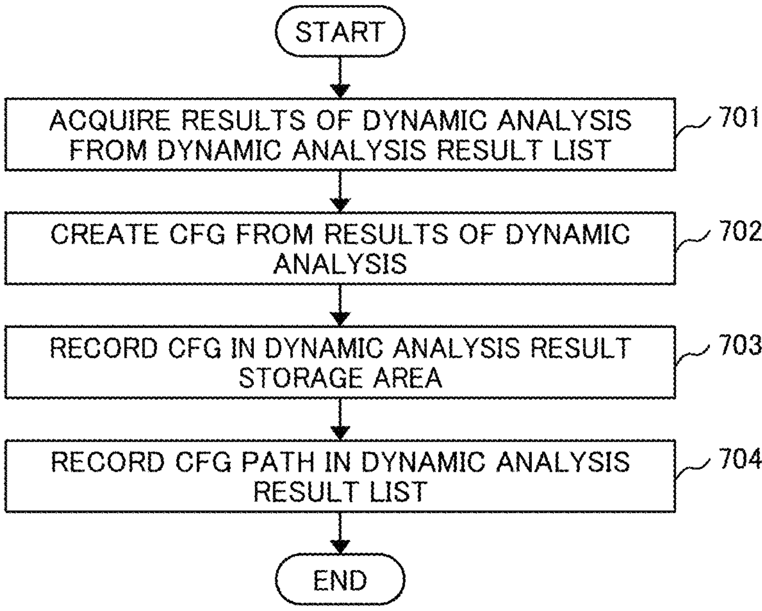
FIG. 7 is a diagram illustrating a flow of a control flow graph creation process.

FIG. 7 is a flowchart illustrating an example of the CFG creation process performed by the analysis evasion function detection system 101 according to Embodiment 1.

When receiving an execution instruction, the CFG creation program 109 executed by the CPU 103 starts the process described below.

The CFG creation program 109 acquires the results of the dynamic analysis from the dynamic analysis result list 114 (step 701).

Then, the CFG creation program 109 creates a CFG on the basis of the results of the dynamic analysis acquired in step 701 (step 702).

Figure 13:
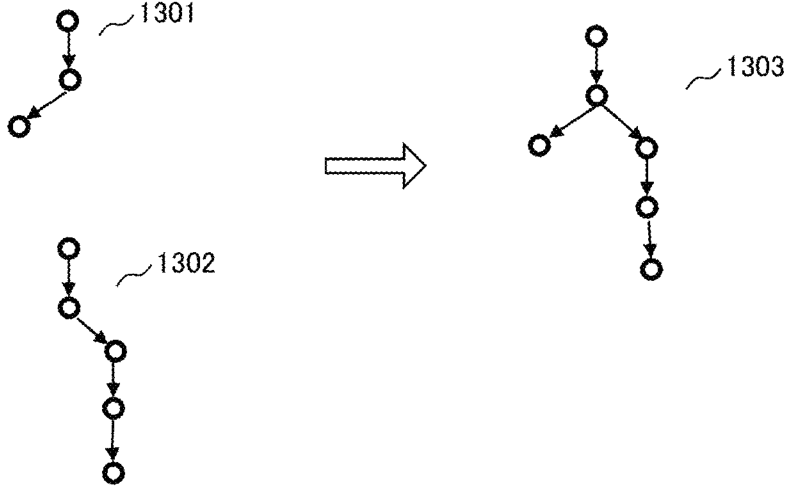
FIG. 13 is a diagram illustrating an example of a control flow graph and a signature.

For example, a CFG 1303 is created by comparing directed graphs 1301 and 1302 in which the functions in the results of the dynamic analysis by each of the dynamic analysis program A 108*a* and the dynamic analysis program B 108*b* are points and a calling relationship between the functions is a side, regarding similar parts as the same, and expressing parts with a large difference as branches as illustrated in FIG. 13.

Then, the CFG creation program 109 stores the CFG obtained in step 702 in the dynamic analysis result storage area 113 (step 703).

Then, the CFG creation program 109 records the storage path of the CFG stored in step 703 in the CFG path 304 of the dynamic analysis result list 114 and ends the process (step 704).

In addition, the CFG creation processing method described with reference to FIG. 7 is an example, and the present invention is not limited thereto. For example, the CFG may be created from a binary code of the malware using static analysis. Further, the CFG may be acquired from a source other than the CFG creation program 109 and then recorded. For example, the CFG may be acquired from an external CFG creation system or CFG creation service.

Figure 8:
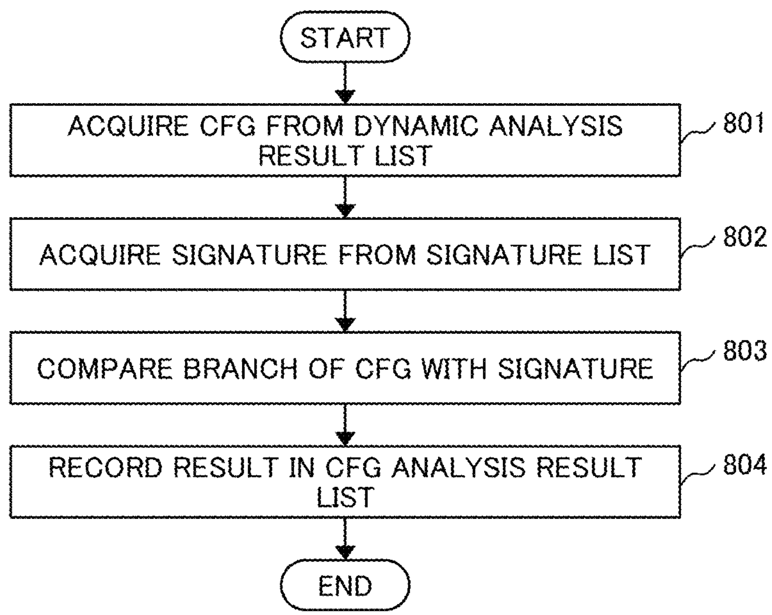
FIG. 8 is a diagram illustrating a flow of a branch specification process using an evasion function.

FIG. 8 is a flowchart illustrating an example of the branch specification process related to the evasion function performed by the analysis evasion function detection system 101 according to Embodiment 1.

When receiving an execution instruction, the branch specification program 110 executed by the CPU 103 starts the process described below.

The branch specification program 110 acquires the CFG from the dynamic analysis result list 114 (step 801).

Then, the branch specification program 110 acquires the signature related to the evasion function from the signature list 116 (step 802).

Then, the branch specification program 110 compares a conditional branch resulting from a difference in the dynamic analysis program 108 in the CFG acquired in step 801 with the signature acquired in step 802 to detect a branch that is likely to be related to the evasion function (step 803).

As a specific example of the signature, for example, as illustrated in FIG. 13, in a case where the destination of the conditional branch in the CFG 1303 obtained by combining the directed graphs 1301 and 1302 created from the results of the dynamic analysis by each of the dynamic analysis program A 108*a* and the dynamic analysis program B 108*b* is short in the analysis result of the dynamic analysis program A 108*a* and continues long in the analysis result of the dynamic analysis program B 108*b*, there is a possibility that the evasion function is manifested at this branch. This CFG pattern is considered as the signature.

Further, it is considered that the presence of a specific function, such as a function opening a system environment setting file used to check whether or not the environment is an environment for dynamic analysis, or a CFG pattern obtained by combining a plurality of functions is used as the signature.

For example, any one of a function, a pattern of a control flow graph, and a combination of the pattern of the control flow graph and the function is used as the signature.

Then, the branch specification program 110 records the function related to the branch detected in step 803 in the function 403 related to the evasion function in the CFG analysis result list 115, records the dynamic analysis program 108, which is likely to be evaded, in the evaded environment 404 in the CFG analysis result list 115, and ends the process (step 804).

In addition, the branch specification processing method described with reference to FIG. 8 is an example, and the present invention is not limited thereto. For example, it is considered that the branch related to the evasion function is detected by performing the creation and acquisition of a plurality of CFGs (for example, the CFG created using static analysis and the CFG created in step 702) in the CFG creation process and comparing the CFGs to analyze the difference.

Further, it is considered that information related to the characteristics of the evasion function is given to the signature and, in a case where the evasion function is detected by the signature, the information related to the characteristics of the evasion function is recorded in the CFG analysis result list 115. In addition, it is considered that, after the branch related to the evasion function is detected, the binary code of the malware corresponding to the branch is recorded in the CFG analysis result list 115.

The analysis evasion function detection system 101 performs a screen depiction process for displaying various types of information to the user, separately from the process described with reference to FIG. 5.

FIG. 9 is a flowchart illustrating an example of the screen depiction process executed by the analysis evasion function detection system 101 according to Embodiment 1.

When receiving an execution instruction, the screen depiction program 111 executed by the CPU 103 starts the process described below.

The screen depiction program 111 acquires information related to the malware to be depicted from the malware list 112 (step 901). Here, it is assumed that a list including an entry composed of the malware ID 201 is acquired.

The screen depiction program 111 acquires the information related to the malware to be depicted from the dynamic analysis result list 114 (step 902). Here, it is assumed that a list including an entry composed of the malware ID 301 is acquired.

The screen depiction program 111 acquires the information related to the malware to be depicted from the CFG analysis result list 115 (step 903). Here, it is assumed that a list including an entry composed of the malware ID 401 is acquired.

The screen depiction program 111 depicts the information related to the malware to be depicted on the screen (step 904) and ends the process.

In addition, the screen depiction method described with reference to FIG. 9 is only an example, and the present invention is not limited thereto.

FIG. 10 is an example of an analysis evasion function detection system depiction screen generated by the program constituting the analysis evasion function detection system 101 according to Embodiment 1.

The screen illustrated in FIG. 10 includes a malware summary 1001 and an analysis evasion function detection result 1002.

The malware summary 1001 is basic information related to the malware to be depicted. For example, the malware summary 1001 includes a malware ID, a registration date and time, a file name, a hash value, an analysis date and time, a dynamic analysis result path, and a CFG path.

The analysis evasion function detection result 1002 is the analysis evasion function detection result of the malware. For example, the analysis evasion function detection result 1002 includes a malware ID, an analysis date and time, a function related to the evasion function, and an evaded environment.

As described above, the malware is displayed with a focus on the analysis evasion function detection result of the malware. Therefore, the effect of supporting the analysis of malware by the users including the analysts is expected.

In addition, here, the depiction screen based on the execution results of each program according to Embodiment 1 is given as an example. However, this is only an example, and the present invention is not limited thereto. For example, any information related to malware analysis may be depicted in any format.

The dynamic analysis of malware is an efficient method for investigating the function of the malware, but the function may not be manifested due to the evasion function. In addition, since the detection and analysis of the evasion function are basically performed manually, the dynamic analysis has a problem in that operational costs and dependency on individual skills are high. Further, there are several known automation methods. However, the automation methods are currently incomplete and particularly have a problem in that there are no sufficient countermeasures to unknown evasion functions.

According to Embodiment 1, the analysis evasion function detection system 101 combines dynamic analysis logs of a plurality of environments to create a control flow graph, detects a branch related to the evasion function using the signature related to the pattern of the control flow graph, and outputs the corresponding part of the log and the related information, thereby supporting the detection and analysis of the analysis evasion function. Therefore, it is expected that the operational costs and the dependency on individual skills related to the detection and analysis of the analysis evasion function will be reduced and the work related to dynamic analysis will be more efficient.

In addition, it is expected that the support results of Embodiment 1 will be applied to system recovery and automation of measures. For example, it is considered that measures to prevent malware infection are automatically executed on the basis of the extracted analysis evasion function, specifically, when it is determined that the analysis evasion function in a virtual environment has detected a specific key in a registry, the value of the key is set to evade infection.

Embodiment 2

Embodiment 2 shows a process of an analysis evasion function detection system that enables the use of a support function from the outside via the network in addition to the support of on-premise malware analysis such that services can be provided via the cloud.

Hereinafter, Embodiment 2 will be described with a focus on the differences from Embodiment 1.

Figure 11:
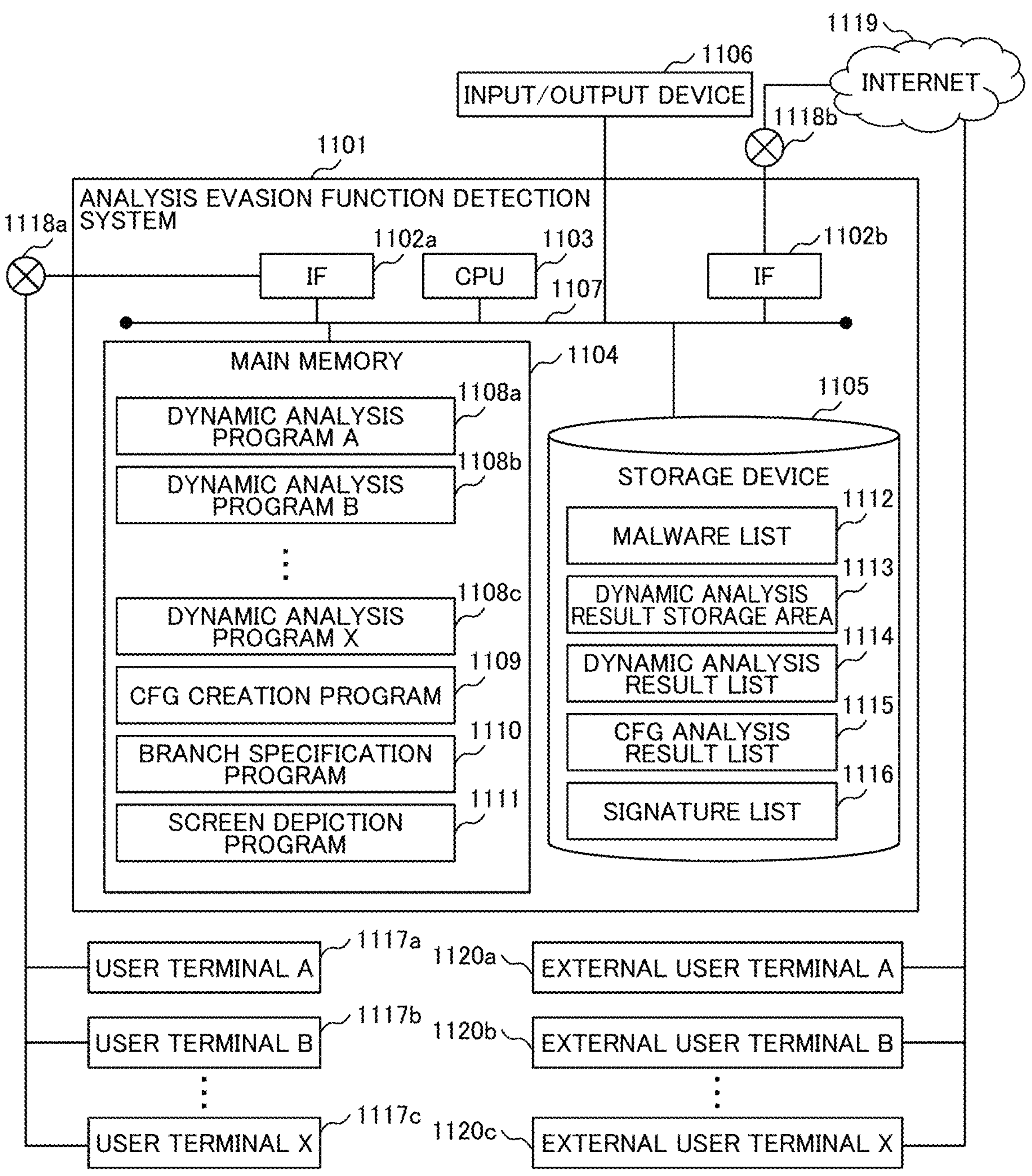
FIG. 11 is a diagram illustrating an example of a configuration of an analysis evasion function detection system according to Embodiment 2.

FIG. 11 is a diagram illustrating an example of a configuration of an analysis evasion function detection system 1101 according to Embodiment 2 of the present invention. Since the configuration of the analysis evasion function detection system according to Embodiment 2 is the same as that according to Embodiment 1, a description thereof will be omitted.

A hardware configuration of the analysis evasion function detection system according to Embodiment 2 differs from the hardware configuration according to Embodiment 1 in that it includes an external user terminal 1120. In Embodiment 2, each program executes processes in response to a request from not only a user terminal 1117 within the network but also the external user terminal 1120 and returns the results to the external user terminal 1120 via the Internet 1119. This makes it possible to provide services via the cloud.

Programs according to Embodiment 2 are the same as those according to Embodiment 1. In addition, processes executed by a dynamic analysis program 1108, a CFG creation program 1109, a branch specification program 1110, and a screen depiction program 1111 according to Embodiment 2 are the same as those according to Embodiment 1. A data structure according to Embodiment 2 is the same as that according to Embodiment 1.

In addition, the configuration of the analysis evasion function detection system 1101 according to Embodiment 2 described with reference to FIG. 11 is only an example, and the present invention is not limited thereto.

According to Embodiment 2, the analysis evasion function detection system 1101 provides an on-premise analysis evasion function detection function to the internal users as in Embodiment 1 and also provides the same information to the external users via the Internet 1119. This makes it possible to provide services via the cloud.

According to the above-described embodiments, dynamic analysis logs of a plurality of environments are combined to create a control flow graph, a branch related to the evasion function is detected using the signature related to the pattern of the control flow graph, and the corresponding part of the log and the related information are output. This makes it possible to support the detection and analysis of the analysis evasion function and to reduce operational costs and dependency on individual skills.

According to the above-described embodiments, the example in which the dynamic analysis of malware is performed using a plurality of dynamic analysis units has been described. However, the present invention is not limited thereto. The dynamic analysis of malware may be performed using a single dynamic analysis unit.

What is claimed is:

1. An analysis evasion function detection system for malware connected to the Internet, comprising:

a central processing unit (CPU) configured to:

execute a plurality of dynamic analysis programs performing dynamic analysis of the malware, combine dynamic analysis results of a plurality of dynamic analysis operations performed by the plurality of dynamic analysis programs to create a control flow graph related to the malware, specify a branch related to an evasion function of the malware in the control flow graph using a predetermined signature to detect the evasion function, and detect a function causing the branch, the signature being any one of the function, a pattern of the control flow graph, and a combination of the pattern of the control flow graph and the function, and present the evasion function of the malware as support information to an analyst.

2. The analysis evasion function detection system according to claim 1, wherein at least one of the dynamic analysis programs actually runs the malware for a predetermined period of time to perform the dynamic analysis of the malware.

3. The analysis evasion function detection system according to claim 1, wherein the CPU is configured to compare and combine relationships between the plurality of dynamic analysis results to create the control flow graph.

4. The analysis evasion function detection system according to claim 1, wherein the CPU is configured to use, as the signature, any one of the function, a pattern of the control flow graph, and a combination of the pattern of the control flow graph and the function.

5. The analysis evasion function detection system according to claim 4, wherein the CPU is configured to specify the branch on the basis of a difference in a pattern of a branch destination of the branch in the control flow graph.

6. The analysis evasion function detection system according to claim 1, wherein the CPU is configured to compare a plurality of the control flow graphs and analyze a difference to specify the branch.

7. The analysis evasion function detection system according to claim 1, further comprising:

a user terminal connected via a predetermined network, wherein the CPU is configured to display the support information on a screen of the user terminal.

8. The analysis evasion function detection system according to claim 7, wherein the CPU is configured to display a malware summary of the malware and an evasion function detection result of the evasion function as the support information on the screen of the user terminal.

9. The analysis evasion function detection system according to claim 8, wherein the malware summary includes the dynamic analysis results of the plurality of dynamic analysis operations, and wherein the evasion function detection result includes a function related to the evasion function and an evaded dynamic analysis environment of the dynamic analysis unit.

10. The analysis evasion function detection system according to claim 1, further comprising:

an external user terminal connected to the Internet, wherein the CPU is configured to display the support information on a screen of the external user terminal.

11. An analysis evasion function detection method in an analysis evasion function detection system for malware connected to the Internet, the analysis evasion function detection method comprising:

a dynamic analysis step of performing dynamic analysis of the malware using a plurality of dynamic analysis units;

a control flow graph creation step of combining dynamic analysis results of a plurality of dynamic analysis operations performed by the plurality of dynamic analysis units to create a control flow graph related to the malware, using a control flow graph creation unit;

a branch specification step of specifying a branch related to an evasion function of the malware in the control flow graph with a predetermined signature to detect the evasion function, and detecting a function causing the branch, using a branch specification unit; and a screen depiction step of presenting the evasion function of the malware as support information to an analyst using a screen depiction unit.

12. The analysis evasion function detection method according to claim 11, wherein, in the branch specification step, the branch is specified from the control flow graph, and a function causing the branch is detected.

13. The analysis evasion function detection method according to claim 12, wherein, in the branch specification step, the branch of the control flow graph and the signature are compared to specify the branch.

* * * * *